(12) United States Patent
Kodama

(10) Patent No.: US 6,727,018 B2
(45) Date of Patent: Apr. 27, 2004

(54) BATTERY HAVING A FILM-TYPE CASING

(75) Inventor: Yasunobu Kodama, Hyogo (JP)

(73) Assignee: Sanyo Electric Co., LTD, Osaka (JP)

( * ) Notice: Subject to any disclaimer, the term of this patent is extended or adjusted under 35 U.S.C. 154(b) by 204 days.

(21) Appl. No.: 10/105,261

(22) Filed: Mar. 26, 2002

(65) Prior Publication Data

US 2002/0192544 A1 Dec. 19, 2002

(30) Foreign Application Priority Data

Mar. 26, 2001 (JP) ........................................ 2001-088833

(51) Int. Cl.[7] ................................................ H01M 2/08
(52) U.S. Cl. ...................................................... 429/175
(58) Field of Search ................................. 429/162, 163, 429/168, 169, 176, 177, 151, 94, 124, 127

(56) References Cited

U.S. PATENT DOCUMENTS 6,451,474 B1 * 9/2002 Kozu et al. ................. 429/100

\* cited by examiner

Primary Examiner—Patrick Ryan
Assistant Examiner—Angela J. Martin
(74) Attorney, Agent, or Firm—Westerman, Hattori, Daniels & Adrian, LLP

(57) ABSTRACT

An object of the present invention is to provide a battery having a film-type casing which is excellent in energy density as well as in strength. Disclosed is a battery having a film-type casing that houses an electrode body, the casing being formed of a film folded together, and the electrode body being formed of at least one positive electrode plate and negative electrode plate laminated together with a separator sandwiched between the electrode plates and having at least one rectangular-shaped outer surface, the battery comprising a reinforcing sheet attached the electrode body so as to cover an area of the rectangular-shaped outer surface corresponding to at least one corner of the positive electrode plate. With this structure, an impact of a drop to a corner of the casing is absorbed by the reinforcing sheet, which prevents the positive electrode from tearing the separator and thus from electrically shorting with the negative electrode plate. The present invention is especially effective when the negative electrode plate and positive electrode plate are band-shaped, the negative electrode plate is wider than the positive electrode plate, and the electrode body is a spiral electrode body formed by winding the positive electrode plate and the negative electrode plate together with the separator sandwiched therebetween.

4 Claims, 5 Drawing Sheets

BATTERY HAVING A FILM-TYPE CASING

BACKGROUND OF THE INVENTION

1. Field of the Invention

The present invention relates to a technique for improving the strength of a battery, such as a polymer battery, having a film-type casing.

2. Description of the Related Art

In recent years, with the widespread proliferation of compact electronic devices, such as mobile phones, portable audio devices, digital cameras, and personal digital assistants (PDAs), there is a rapidly growing demand for a battery that is thin, lightweight, and yet has high energy density. To meet this demand, there has been provided a battery, such as a lithium ion polymer electrolyte battery, having a film-type casing of a slim rectangular parallelepiped shape (the term "slim" used herein refers to the order of a few millimeters). To be more specific, it is a new type of battery having an electrode body formed in a slim rectangular parallelepiped shape, and housed in a casing that is constituted of a flexible, extremely thin film folded together. Such a battery can be extremely slim and lightweight while being comparatively large in energy density. For this reason, expectations run high for such a battery as a promising power supply for the sort of compact electronic devices mentioned above.

Generally, because the casing is flexible, a battery having a film-type casing is easily deformed (especially, bent on a side or concaved by depression) when dropped for instance. When the film-type casing is deformed, the electrode body housed therein is often deformed as well, which results in the possibility of an electric short.

One solution to address this problem is to attach a plastic-molded reinforcing plate at the bottom of the battery so as to absorb impact of a drop. This reinforcing plate, however, causes a reduced energy density because of the space that the reinforcing plate occupies within the battery.

As described above, there still are problems to be solved regarding a battery having a film-type casing.

SUMMARY OF THE INVENTION

An object of the present invention is to provide a battery having a film-type casing which is excellent in energy density as well as in strength.

The above object of the present invention is achieved by a battery housed in a casing that is constituted of a film folded together, the battery comprising: an electrode body formed of at least one positive electrode plate and at least one negative electrode plate, and a separator sandwiched between the electrode plates, and having at least one rectangular-shaped outer surface; and a reinforcing sheet attached to the electrode body so as to cover an area of the rectangular-shaped outer surface corresponding to at least one corner of the positive electrode plate.

Here, the present invention is especially effective when the negative electrode plate and the positive electrode plate are band-shaped, the negative electrode plate is wider than the positive electrode plate, and the electrode body is a spiral electrode body formed by (1) winding the positive electrode plate and the negative electrode plate together with the separator sandwiched therebetween, and (2) compressing the wound electrode plates from a circumferential direction so as to form the rectangular-shaped outer surface.

Further, the reinforcing sheet may also function as a wind-fastener for securing a winding-end of the electrode plate forming an outermost layer of the electrode body.

Still further, the present invention is especially effective when the positive electrode plate forms the outer surface of the electrode body.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

1. Embodiment 1

1-1. Structure of Polymer Battery

Figure 1:
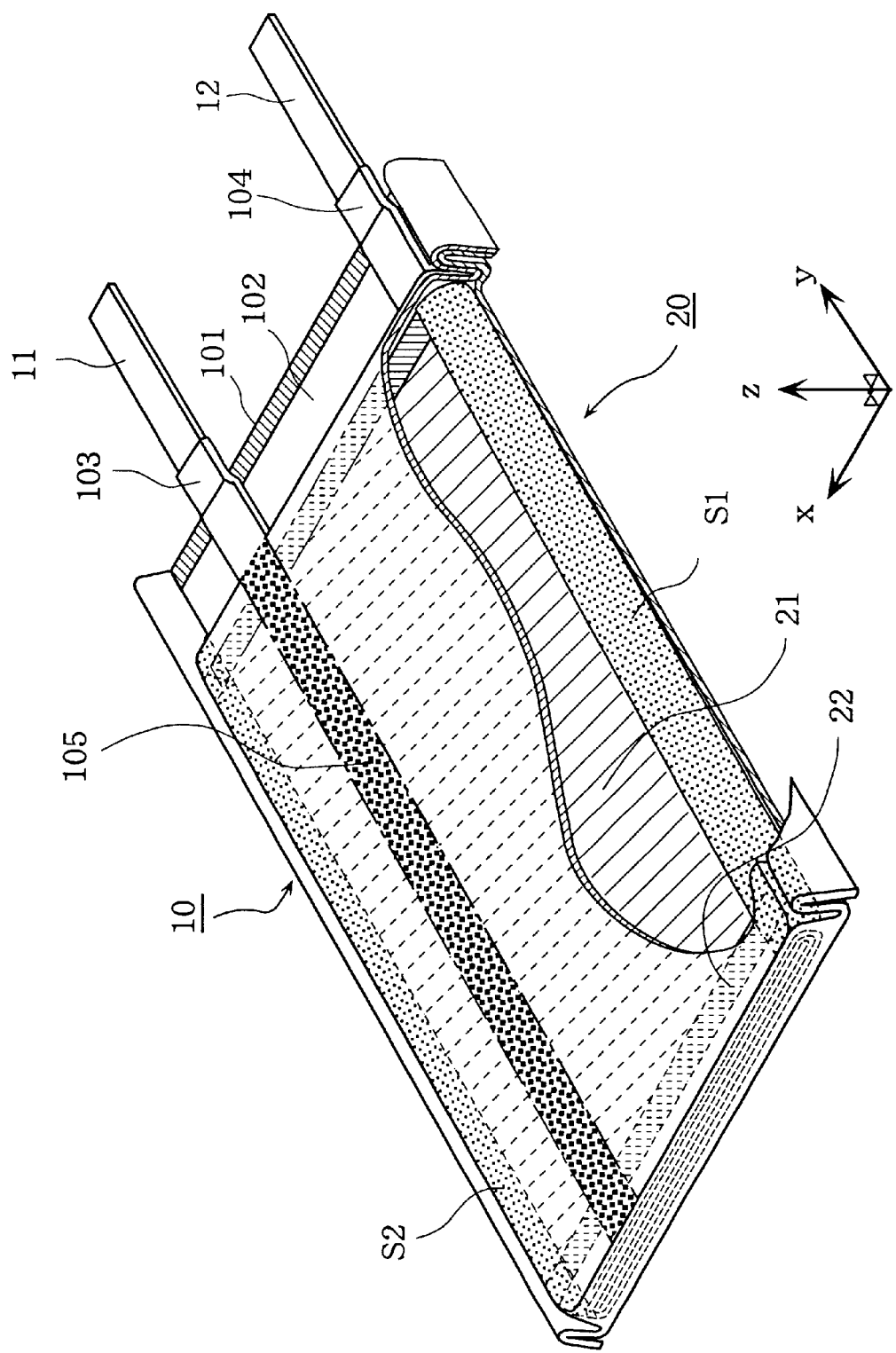
FIG. 1 is a partial cross-sectional view depicting a lithium ion polymer battery 1 consistent with an embodiment 1 of the present invention.
Figure 2:
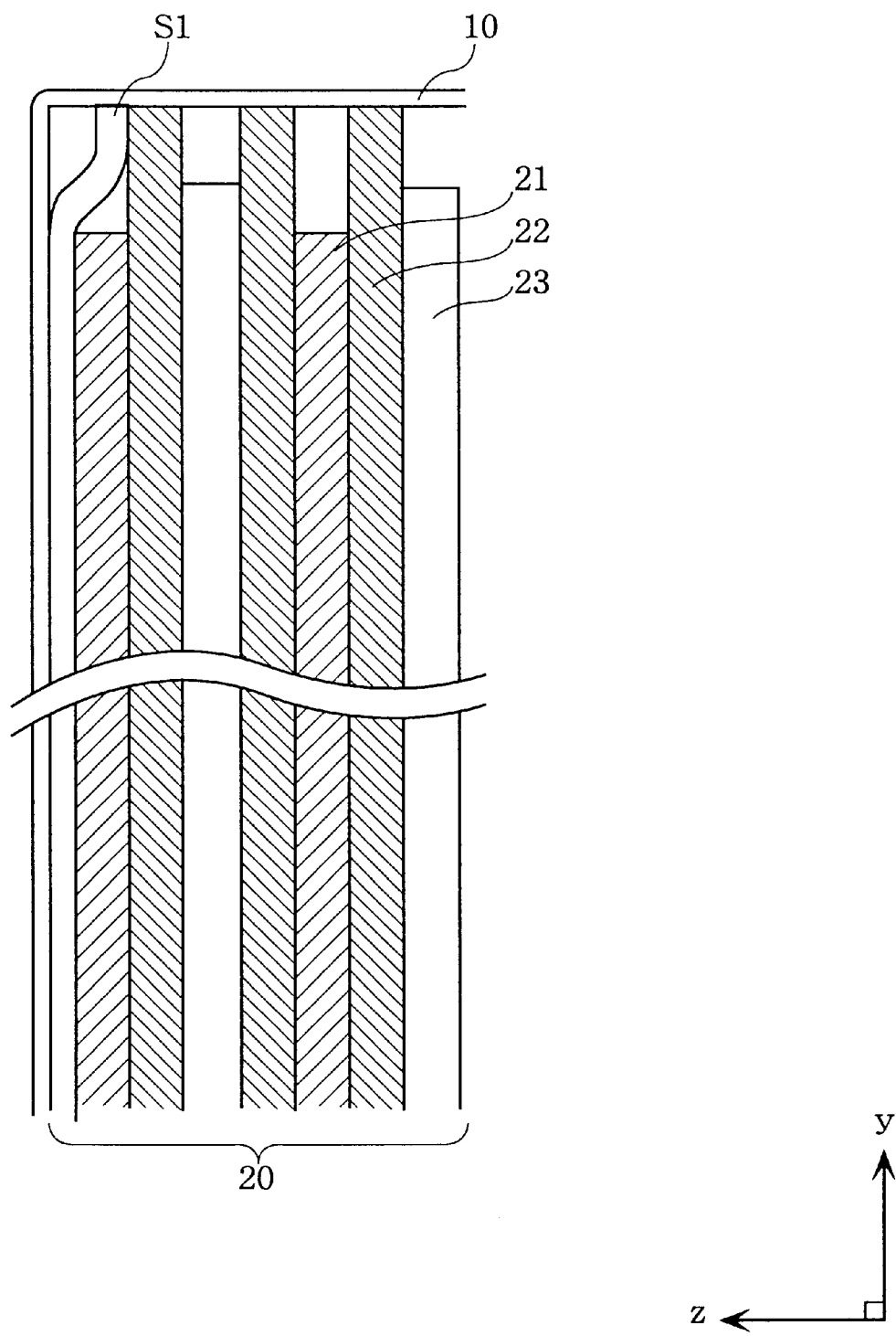
FIG. 2 is a cross-sectional view depicting the battery shown in FIG. 1.

FIG. 1 is a partial cross-sectional view depicting a lithium ion polymer battery 1 (hereinafter referred to as a "battery 1") which is a nonaqueous electrolyte battery consistent with an embodiment 1 of the present invention. FIG. 2 is a cross-sectional view depicting the battery 1 (a cross-sectional view along a y-z plane near a side of a casing 10 in an x direction)

As shown in FIG. 1, the battery 1 has the casing of which sides are both folded. Housed in the casing 10 is an electrode body 20 constituted of polymer electrolyte. The battery 1 also has a positive electrode plate terminal 11 made of aluminum and a negative electrode plate terminal 12 made of nickel which are separately extending from the electrode body 20 upwardly (in the y direction) beyond the casing 10.

Specifically, the casing 10 is composed of a strip shaped polypropylene/aluminum/polypropylene laminate film of a fixed length (thickness of 100 $\mu$m) that is folded in half and cut to a predetermined width. Both sides of the folded sheet are then thermo-compression bonded so as to be in an envelope-like form. As a result, the electrode body 20 is sealed within the casing 10.

The electrode body 20 is constituted by winding a positive electrode 21 and a negative electrode 23 together with a separator 22 sandwiched therebetween to form a spiral electrode, and then compressing the spiral electrode flat so as to form a rectangular shape (specifically, a thin rectangular parallelepiped shape). The electrode body 20 is impregnated with a gel polymer electrolyte.

Note that the electrode body 20 has curved sides, which means it is not a precise rectangular shape. The term, "a rectangular shape" used herein includes such a shape.

The positive electrode plate 21 is constituted of aluminum foil with lithium cobalt oxide $LiCoO_2$ applied thereon.

The negative electrode plate 23 is constituted of copper foil with graphite powder applied thereon.

The separator 22 is constituted of porous polyethylene having a thickness of 0.03 mm.

Note that, as shown in FIG. 2, the electrode body 20 is so constructed that, in the y direction, the negative electrode plate 23 is longer than the positive electrode plate 21, and the separator 22 is longer than the negative electrode 23. This arrangement is to secure the larger area of the negative electrode plate 23 than that of the positive electrode plate 21. With this structure, the negative electrode plate 23 sufficiently absorbs Li ion from the positive electrode plate 21 at the time of charging, thereby suppressing the occurrence of dendrite. The reference numeral 105 denotes a wind-fastener tape for securing the outermost end of the positive electrode plate 21.

The polymer electrolyte with which the electrode body 20 is impregnated, for example, is prepared as follows. First, polyethylene glycol diacrylate is mixed with an EC/DEC mixture (mass ratio 30:70) in proportions of 1:10. Having been added 1 mol/l of $LiPF_6$ thereto, the resulting mixture undergoes thermal polymerization so as to be rendered into gel form.

The positive electrode plate 21 and the negative electrode plate 23 have the positive electrode plate terminal 11 and the negative electrode plate terminal 12 attached thereto, respectively, in such a manner that the terminals are exposed outside of the casing 10. The positive electrode plate terminal 11 and the negative electrode plate terminal 12 are wrapped by denatured polypropylene 103 and 104, respectively, for sealing at a position corresponding to a sealing part 102 of the casing 20 which houses the electrode body 20. The sealing part 102 is thermo-compression bonded in a position corresponding to the denatured polypropylene 103 and 104, so that the casing 20 is hermetically sealed.

The feature of this embodiment 1 lies in that, as shown in FIG. 1, reinforcing sheets S1 and S2 made of polyolefin-based material are attached onto the outermost surface of the electrode body 20 along both sides thereof. These reinforcing sheets S1 and S2 are attached to the electrode body 20 (or equivalently, the positive electrode plate 21) on the outermost surface thereof in a manner to cover, with respect to the four corners of the electrode body 20, the edge portion of the positive electrode plate 21 as well as the exposed portion of the separator 22. The reason for providing theses reinforcing sheets S1 and S2 is as follows.

1-2. Effect of Embodiment 1

A battery having a film-type casing is often deformed more easily than a battery cased in a metallic external can or the like when, for example, it is impacted against the floor. When the film-type casing is deformed, the electrode body housed therein is likely to be deformed as well, which results in the possibility of a short circuit. After considerable study by the inventors of the present invention, it is clarified that such a short circuit is likely to occur when a corner of the battery hits the floor, and consequently when the impact causes a corner of the outermost electrode plate constituting the electrode body to tear the separator. This is especially so, when a positive electrode plate is arranged as the outermost electrode plate constituting the electrode body. In such a case, there is a negative electrode plate located in the corner of the electrode body via the separator, so that a short circuit is likely to occur. Further, when the electrode body is compressed to be flat, the electrode plate is bent along lengthwise sides of the electrode body, which often causes corners of the bending portion to be sharply pointed. Under the circumstances, an impact to the corners is likely to cause such a sharply pointed portion to tear the separator, which consequently results in occurrences of a short circuit.

In contrast, according to the structure of the above battery 1, the separator 22 is covered with the positive electrode plate 21 as well as with the reinforcing sheets S1 and S2 with respect to the four corners of the positive electrode plate 21 which is arranged to be the outermost layer of the electrode body 20. With this structure, an impact to a corner of the casing is absorbed by the reinforcing sheets, which prevents the positive electrode from tearing the separator and thus from electrically shorting with the negative electrode plate. Further, in the polymer battery consistent with this embodiment, the reinforcing sheets are made of comparatively thin sheets, and are provided only along the longitudinal sides of the electrode body 20. This achieves the effect of excellently suppressing any reduction in energy density.

The reinforcing sheets S1 and S2 as described above are especially effective when applied in a battery such as one in the embodiment 1 having the spiral electrode body 20, because such a battery easily shorts out internally due to an impact of drop and other impacts.

Note that FIG. 2 shows the reinforcing sheet S1 only, yet in this embodiment 1, the reinforcing sheet S2 is also provided in the same manner.

Figure 3:
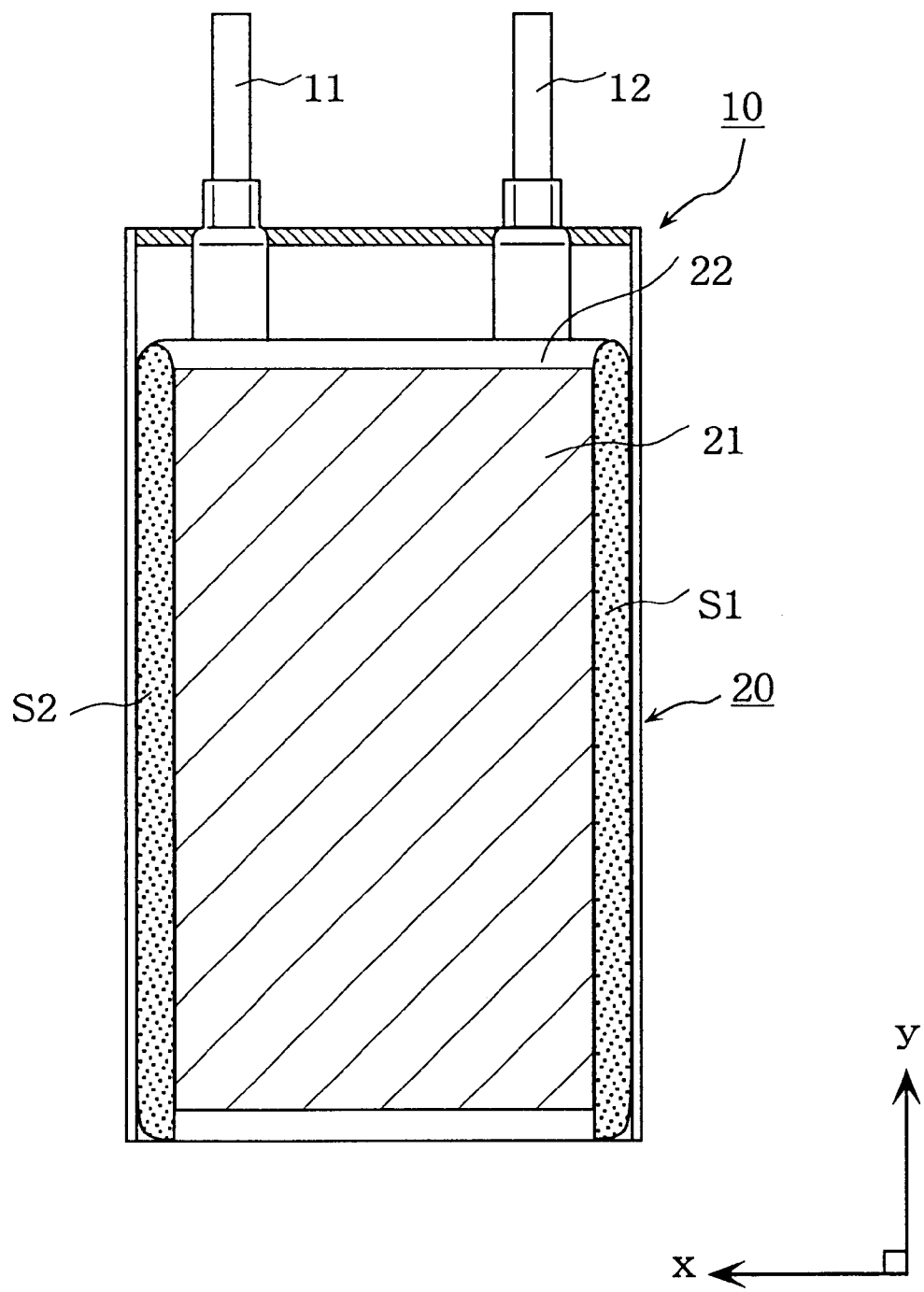
FIG. 3 is a partial cross-sectional view showing one variation of the embodiment 1.

FIG. 3 is a view showing one variation of the embodiment 1 of the present invention as seen from the front. In this figure, the casing 10 is cut away at a position corresponding to the electrode body 20 to show the inside. As shown in the figure, this battery is an example of the reinforcing sheet S1 or S2 also functioning as a wind-fastener tape for securing the outermost end of the positive electrode plate 21. Such a modification may be made in the present invention.

2. Other Embodiments

Hereinafter, description is given to other embodiments of the present invention.

2-1. Embodiment 2

Figure 4:
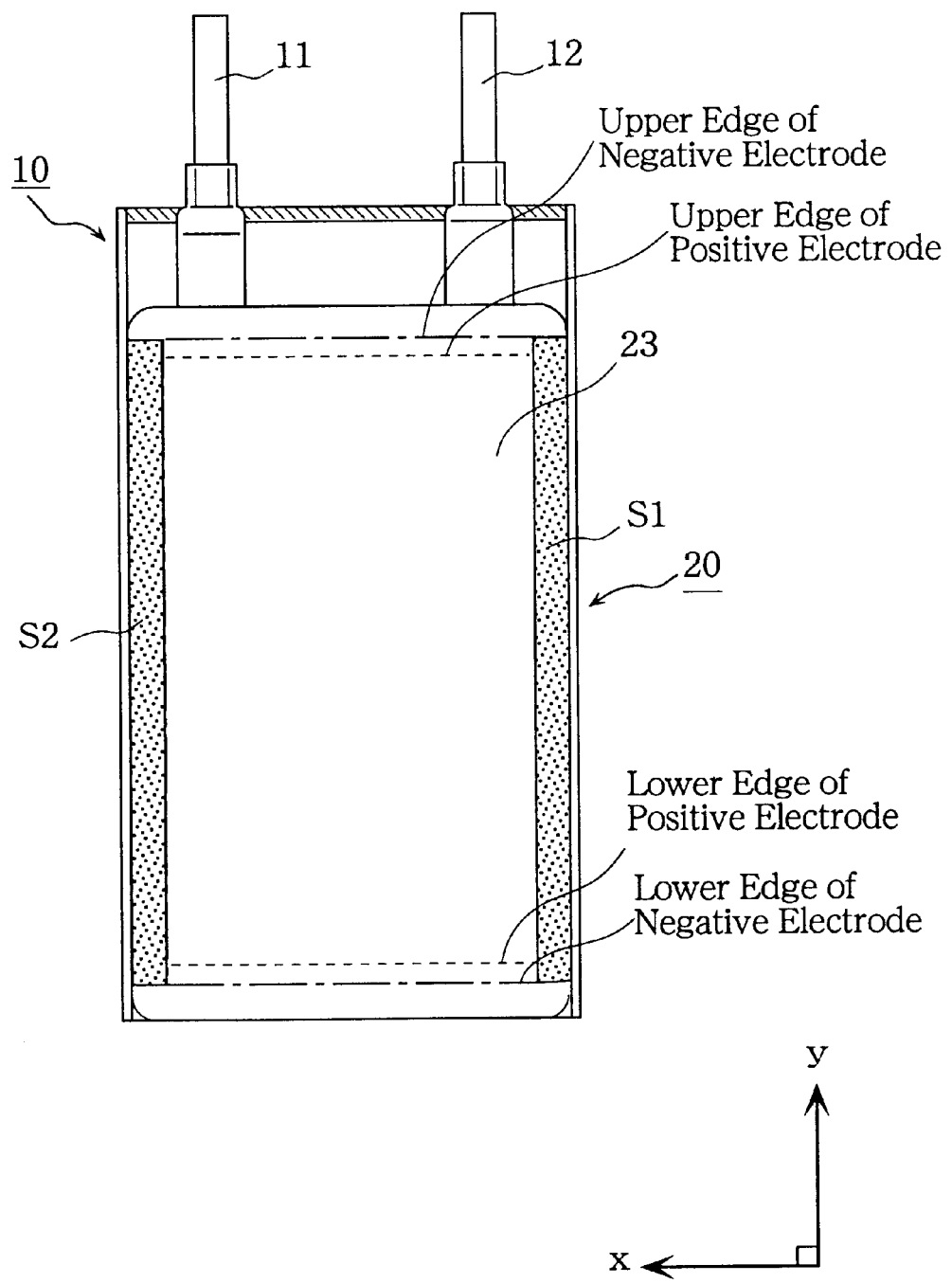
FIG. 4 is a partial cross-sectional view depicting a battery consistent with an embodiment 2 of the present invention.

FIG. 4 is a partial cross-sectional view depicting a battery consistent with an embodiment 2 as seen from the front. As shown in the figure, the structure of this battery is such that the negative electrode plate 23 is arranged as the outermost layer of the electrode body 20. The present invention may be applied to a battery having such a structure. Specifically, in this example, the reinforcing sheets S1 and S2 have such a length and arrangement that they at least cover the negative electrode plate 23 fully in the y direction (to be more precise, at least cover non-illustrated edges of the positive electrode plate 23 in the y direction, which are the edges behind the separator 22 in the figure). With this structure, the same effect as the above embodiment is achieved.

Note that it is sufficient that each of the reinforcing sheets S1 and S2 is arranged to cover at least one of the upper edge and lower edge of the positive electrode plate in the y direction.

2-2. Embodiment 3

Figure 5:
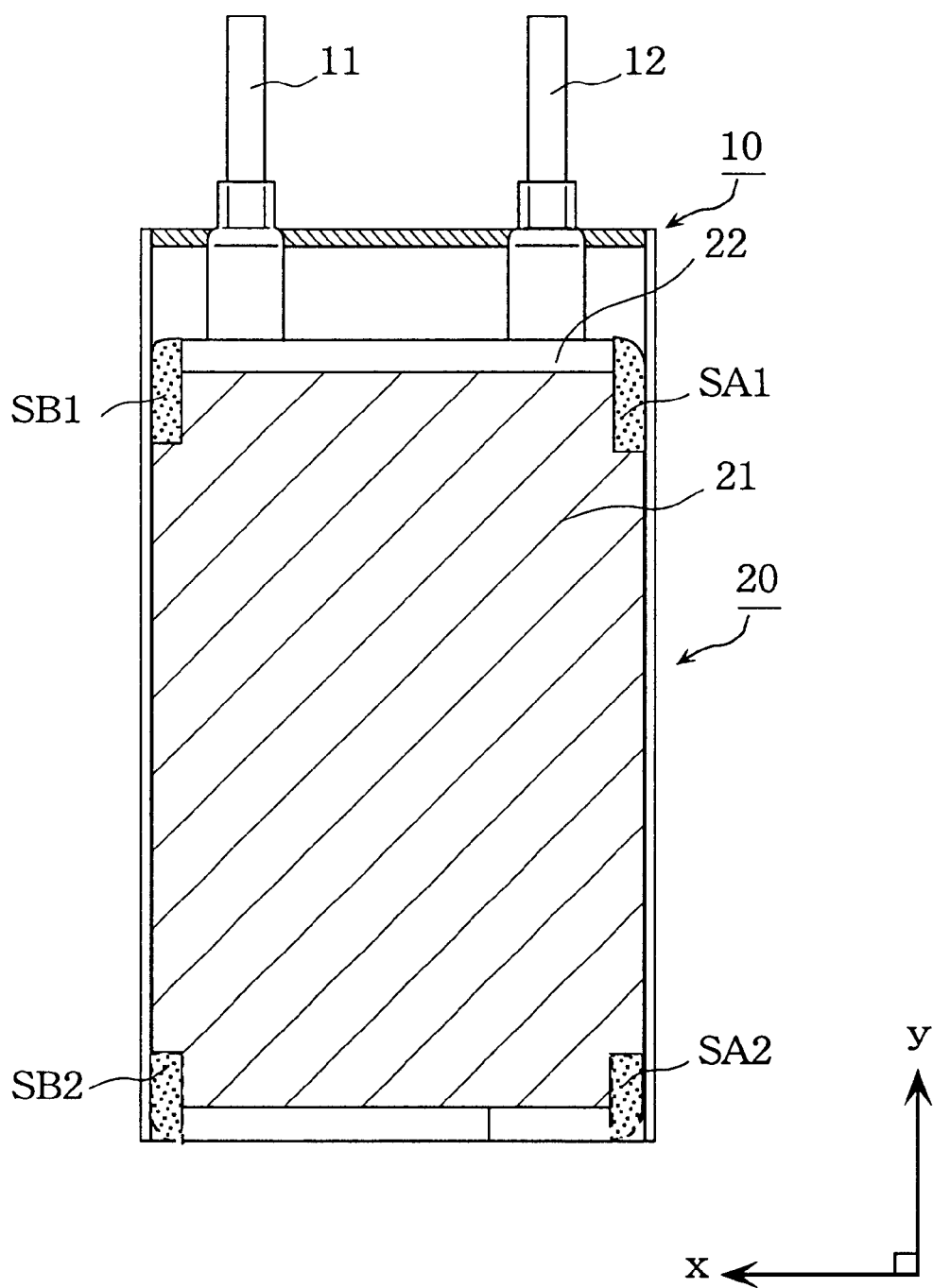
FIG. 5 is a partial cross-sectional view depicting a battery consistent with an embodiment 3 of the present invention.

FIG. 5 is a partial cross-sectional view depicting a battery consistent with an embodiment 3 of the present invention as seen from the front. As shown in the figure, the structure of this battery is such that reinforcing sheets SA1, SA2, SB1 and SB2 are provided on the four corners of the electrode body 20 like four separate spots in a manner to cover the y-direction edges of the positive electrode plate 21 as well as the exposed portion of separator 22. With this structure, the same effect as the above embodiments is as well achieved.

Note that provision of only one of the reinforcing sheets SA1, SA2, SB1 and SB2 still achieves the above effect to some extent. Yet, preferably, the two reinforcing sheets SA2 and SB2 are provided at the bottom of the battery, and more preferably, all of the four reinforcing sheets are provided.

3. Experiments to Compare Performance of Embodiments

The following batteries were manufactured as batteries consistent with the embodiments of the present invention.

Batteries of comparative examples were manufactured in the same manner except that no reinforcing sheets were provided.

Embodiment Battery 1 (corresponding to the embodiment 1)

Embodiment Battery 2 (corresponding to the embodiment 2)

Embodiment Battery 3 (corresponding to the variation of the embodiment 1 (as shown in FIG. 3)

Comparative Battery 1 (battery with a negative electrode plate as the outermost layer)

Comparative Battery 2 (battery with a positive electrode plate as the outermost layer)

Fifty of each type of battery as above were manufactured and subjected to a drop test in which they were dropped from a height of 1.9 meters. A jig was attached to each battery, so that the bottom of the battery would hit the floor first. Each battery was dropped until it electrically shorted out. The average of the number of drops was studied for each type of battery. Table 1 below shows the data obtained through the experiment.

TABLE 1

|  | Embodiment Battery 1 | Embodiment Battery 2 | Embodiment Battery 3 | Comparative Battery 1 | Comparative Battery 2 |
| --- | --- | --- | --- | --- | --- |
| Number of Drops Required for Shorting | 22 | 24 | 23 | 12 | 6 |

As apparent from Table 1, the embodiment batteries 1 to 3 all exhibited rates of shorting that were less than half the rates of shorting of the comparative batteries, which demonstrated excellent performance of the present invention. That is, the present invention realizes a battery having a film-type casing of which energy density and strength are both excellent.

4. Other Points

The embodiments described above are mainly of the batteries having the positive electrode plate 21 as the outermost layer of the electrode body 20. This is merely because internal shorting occurs relatively often when the positive electrode plate 21 is arranged as the outermost layer of the electrode body 20. The present invention is suitably applicable to batteries having the electrode body with the structure other than the above (with the structure of the embodiment 2), and still achieves excellent effect.

Although the above embodiments relate to of a lithium ion polymer battery, the present invention is not limited to these particular embodiments. The present invention is suitably applicable to a battery having other types of electrode bodies.

Further, materials for the reinforcing sheets are not limited to the ones mentioned in the above embodiments. Examples of possible materials include polypropylene tape, polyphenylene sulfide tape, and polyimide tape.

Still further, the casing used in the above embodiments is made of laminate films. Yet, the present invention is not limited to the specific embodiments. The film-type casing of the present invention may be made of films other than laminate films.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A battery having a film-type casing, comprising:

an electrode body formed of at least one positive electrode plate and at least one negative electrode plate, and a separator sandwiched between the electrode plates, and having at least one rectangular-shaped outer surface; and a reinforcing sheet attached to the electrode body so as to cover an area of the rectangular-shaped outer surface corresponding to at least one corner of the positive electrode plate.

2. The battery according to claim 1, wherein the negative electrode plate and the positive electrode plate are band-shaped, the negative electrode plate is wider than the positive electrode plate, and the electrode body is a spiral electrode body formed by (1) winding the positive electrode plate and the negative electrode plate together with the separator sandwiched therebetween, and (2) compressing the wound electrode plates from a circumferential direction so as to form the rectangular-shaped outer surface.

3. The battery according to claim 1, wherein the electrode body is a spiral electrode body formed by winding the band-shaped positive electrode plate and the band-shaped negative electrode plate, and the separator sandwiched therebetween, and the reinforcing sheet additionally functions as a windfastener for securing a winding-end of the electrode plate forming an outermost layer of the electrode body.

4. The battery according to claim 1, wherein the positive electrode plate forms the outer surface of the electrode body.

* * * * *